US008978263B2

(12) United States Patent
Nahum et al.

(10) Patent No.: US 8,978,263 B2
(45) Date of Patent: Mar. 17, 2015

(54) HANDHELD MEASUREMENT TOOL WITH USER DEFINED DISPLAY

(75) Inventors: Michael Nahum, Kirkland, WA (US); Kim W. Atherton, Kirkland, WA (US)

(73) Assignee: Mitutoyo Corporation, Kanagawa-ken (JP)

( * ) Notice: Subject to any disclaimer, the term of this patent is extended or adjusted under 35 U.S.C. 154(b) by 310 days.

(21) Appl. No.: 13/563,482

(22) Filed: Jul. 31, 2012

(65) Prior Publication Data

US 2014/0033554 A1 Feb. 6, 2014

(51) Int. Cl.
| | |
|---|---|
| *G01B 5/02* | (2006.01) |
| *G01B 3/18* | (2006.01) |
| *G01B 3/22* | (2006.01) |
| *G01B 3/24* | (2006.01) |
| *G01B 3/28* | (2006.01) |
| *G06F 9/445* | (2006.01) |
| *G06F 9/44* | (2006.01) |

(52) U.S. Cl.
CPC .. *G01B 3/24* (2013.01); *G01B 3/18* (2013.01); *G01B 3/22* (2013.01); *G01B 3/28* (2013.01); *G06F 8/38* (2013.01); *G06F 9/4443* (2013.01); *G06F 9/44505* (2013.01)
USPC .......................................................... 33/784

(58) Field of Classification Search
USPC ................................................... 33/783, 784
See application file for complete search history.

(56) References Cited

U.S. PATENT DOCUMENTS

| | | | | |
|---|---|---|---|---|
| 4,653,910 | A * | 3/1987 | Poling .............................. | 33/294 |
| 4,711,034 | A | 12/1987 | Koizumi | |
| 4,857,840 | A * | 8/1989 | Lanchais ..................... | 33/355 R |
| 4,862,598 | A * | 9/1989 | Barlow et al. ................... | 33/613 |
| 4,876,800 | A * | 10/1989 | Pekar et al. ..................... | 33/784 |
| 5,249,366 | A * | 10/1993 | Takahashi et al. .............. | 33/811 |
| 5,287,631 | A * | 2/1994 | Stade .............................. | 33/823 |
| 6,081,782 | A | 6/2000 | Rabin | |
| 6,145,207 | A * | 11/2000 | Brunson ..................... | 33/199 R |
| 6,255,942 | B1 | 7/2001 | Knudsen | |
| 6,820,347 | B2 * | 11/2004 | Mellander .................... | 33/555.1 |
| 6,844,822 | B2 * | 1/2005 | Lemp, III ........................ | 33/628 |
| 6,879,653 | B2 * | 4/2005 | Arias et al. ...................... | 33/784 |
| 7,253,790 | B2 | 8/2007 | Kirkland et al. | |
| 7,333,219 | B2 | 2/2008 | Yu et al. | |
| 7,500,198 | B2 | 3/2009 | Mathews et al. | |
| 7,913,411 | B2 * | 3/2011 | Klepp ............................. | 33/544.5 |
| 8,352,212 | B2 * | 1/2013 | Fetter et al. ..................... | 33/503 |
| 8,650,764 | B2 * | 2/2014 | Hartford et al. ................ | 33/3 A |
| 8,792,709 | B2 * | 7/2014 | Pulla et al. ...................... | 33/503 |
| 2002/0152620 | A1 * | 10/2002 | Lemp, III ........................ | 33/268 |

(Continued)

*Primary Examiner* — Yaritza Guadalupe-McCall
(74) *Attorney, Agent, or Firm* — Seed IP Law Group PLLC (57) ABSTRACT

A handheld measurement tool with a display that can be defined by a user. The handheld measurement tool may be a portable measurement gauge (e.g. a digital caliper, digital "dial" gauge, height gauge, micrometer, indicator, etc.) that may be utilized for measuring precise physical dimensions of workpieces. The display may be independently modified according to a customer's individual needs for various precision measurement applications. A remote device (e.g. PC, laptop, tablet, smartphone, etc.) may be utilized for reconfiguring the display, wherein a user can select and modify display format arrangements on the remote device. When the remote device is coupled to the portable measurement gauge, the gauge display is reconfigured so as to have a similar appearance to the defined display format arrangement. In certain embodiments, voice commands may be reconfigured and used for controlling the gauge display.

20 Claims, 6 Drawing Sheets

(56) References Cited

U.S. PATENT DOCUMENTS

| | | |
|---|---|---|
| 2008/0060210 A1* | 3/2008 | Trout et al. .................... 33/773 |
| 2008/0072167 A1 | 3/2008 | Choi et al. |
| 2008/0092169 A1 | 4/2008 | Shannon et al. |
| 2008/0163504 A1* | 7/2008 | Smith et al. .................... 33/268 |
| 2008/0195242 A1 | 8/2008 | Tidwell |
| 2008/0235970 A1* | 10/2008 | Crampton .................... 33/503 |
| 2009/0271996 A1* | 11/2009 | Ferrari et al. .................... 33/502 |
| 2010/0088100 A1 | 4/2010 | Lindahl |
| 2010/0275456 A1* | 11/2010 | Lord .................... 33/706 |
| 2011/0067253 A1* | 3/2011 | Happel .................... 33/512 |
| 2014/0033554 A1* | 2/2014 | Nahum et al. .................... 33/784 |

\* cited by examiner

HANDHELD MEASUREMENT TOOL WITH USER DEFINED DISPLAY

BACKGROUND

One type of handheld measurement tool with a display is a portable measurement gauge. Certain types of portable measurement gauges (e.g. digital calipers, digital "dial" gauges, height gauges, micrometers, indicators, etc.) may be utilized for measuring precise physical dimensions (e.g. at the micron or sub-micron level) of workpieces. The displays for such devices are typically small, and often come in relatively fixed formats, where a user may at most be able to toggle between different pre-defined display modes. A need exists for users to be able to independently modify the appearance and functionality of such displays according to individual needs.

DETAILED DESCRIPTION

In accordance with one aspect, a remote device is utilized for reconfiguring a display on a portable measurement gauge. The portable measurement gauge may be a precision measurement instrument (e.g. a digital caliper, digital "dial" gauge, height gauge, micrometer, indicator, etc.) The portable measurement gauge measures one or more physical dimensions of an object, and includes a configurable gauge display which indicates measurement information based on workpiece measurements performed by the portable measurement gauge. The remote device may be any of a number of different types of computing devices (e.g. a PC, laptop, tablet, smartphone, etc.) The remote device can be coupled by at least one of a wired or wireless connection to the portable measurement gauge, and includes a remote memory and a remote display. The remote memory stores one or more display format options which are selectable to be represented in a display format arrangement on the remote display. When the remote device is coupled to the portable measurement gauge and a user defines a display format arrangement using the remote device, the remote device commands the portable measurement gauge to reconfigure the gauge display so as to have a similar appearance to the defined display format arrangement.

In accordance with another aspect, at least one display format option may control at least one of a change in the size, location, orientation, color or units of at least one number or letter on the display that is related to or representative of a workpiece measurement performed by the portable measurement gauge. At least one display format option may represent the addition of at least one visual indicator. At least one display format option may represent a function which may be modified by a user on the remote device and then represented on the gauge display. At least one display format option may represent a graphical display of measurement data. At least one display format option may represent a statistical display of a plurality of workpiece measurements performed by the portable measurement gauge.

In accordance with another aspect, at least one internal characteristic of the portable measurement gauge may be downloaded to the remote device to either activate or deactivate at least one display format option presented on the remote device. At least one internal characteristic of the portable measurement gauge may be downloaded to the remote device to be mimicked in a display format arrangement on the remote display. For example, an internal characteristic may be a color on the gauge display which is represented by a corresponding color in the display format arrangement on the remote display. In one embodiment, the remote device may download and save a current set of characteristics for the display of the portable measurement gauge, so that a previous configuration can be returned to, if desired.

In accordance with another aspect, the display format arrangement on the remote display is operational as the portable measurement gauge is used such that the behavior in response to any measurement operations can be viewed in the display format arrangement on the remote display. More generally, a real time link may be established when the portable measurement gauge is coupled to the remote device such that changes on one of the gauge display and remote display are mimicked on the other display in real time.

In accordance with another aspect, the remote device may be configured to be coupled by at least one of a wired or wireless connection to a first portable measurement gauge and at least a second portable measurement gauge comprising a configurable gauge display similar to the configurable gauge display of the first portable measurement gauge, and when a user defines a display format arrangement for the first portable measurement gauge using the remote device as outlined herein, the remote device is furthermore configured to command the second portable measurement gauge to reconfigure the gauge display of the second portable measurement so as to have a similar appearance to the defined display format arrangement of the first portable measurement gauge.

In accordance with another aspect, the portable measurement gauge further includes a voice input element that is capable of sensing a voice command from a user. The user may record a voice command on the remote device, and assign an action command (e.g. a display format option) to the recorded voice command. The display format option and associated voice command may then be downloaded to the portable measurement gauge. Then, in operation, when the associated voice command is sensed by the voice input element of the portable measurement gauge, the gauge display is controlled in accordance with the associated display format option. As a specific illustrative example, a user may record a voice command to "change units", wherein the gauge display will change from inches to mm.

Various embodiments of the invention are described below. The following description provides specific details for a thorough understanding and an enabling description of these embodiments. One skilled in the art will understand, however, that the invention may be practiced without many of these details. In addition, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments of the invention.

Figure 1:
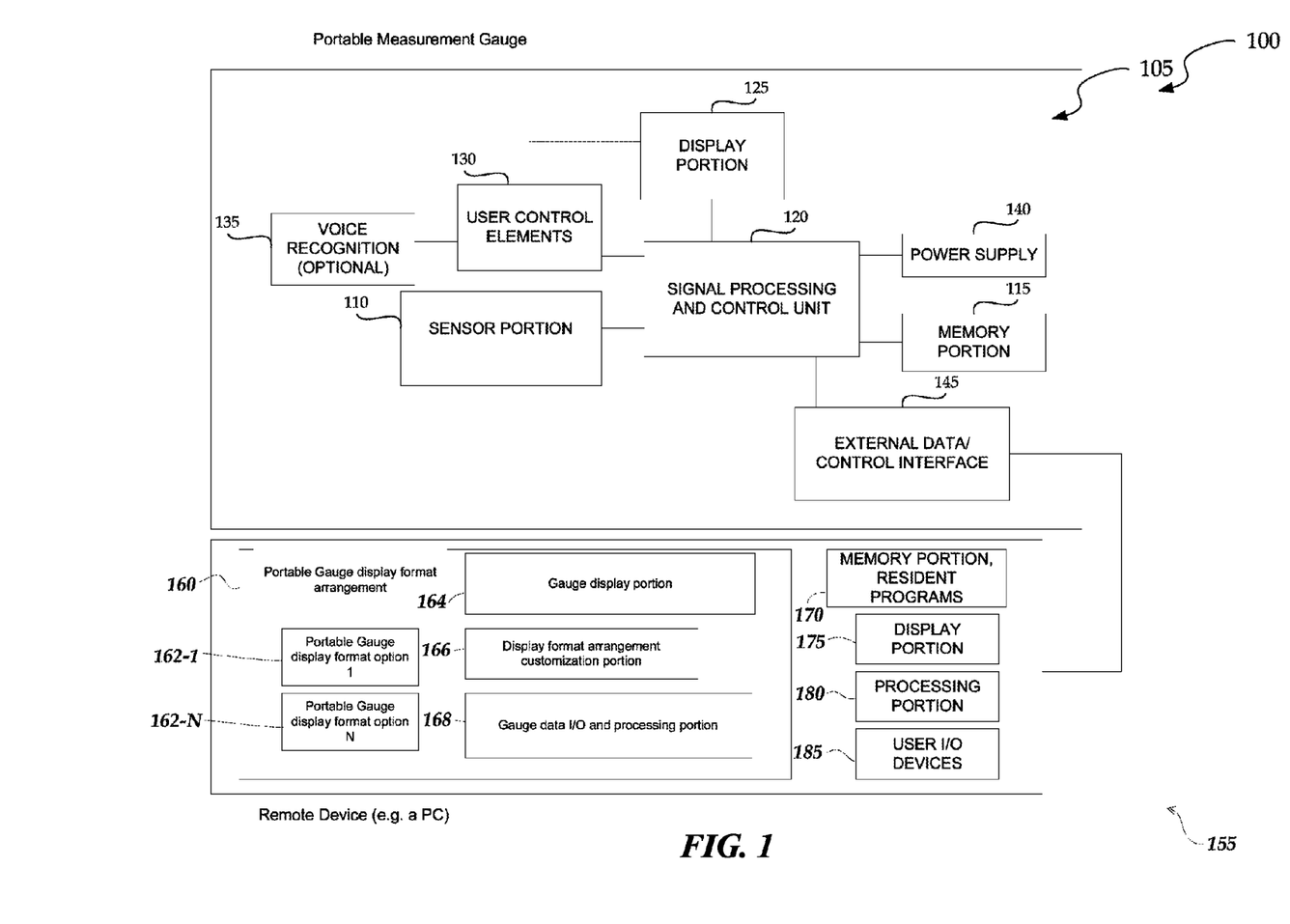
FIG. 1 is a block diagram of a system including a portable measurement gauge and a remote device.

FIG. 1 is a block diagram of a display configuration system 100 including a portable measurement gauge 105 and a remote device 155. The portable measurement gauge 105 may be a precision measurement instrument (e.g. a digital caliper, digital "dial" gauge, height gauge, micrometer, indicator, etc.), and the remote device 155 may be any type of computing device (e.g. a PC, laptop, tablet, smartphone, etc.) As shown in FIG. 1, the portable measurement gauge 105 includes a sensor portion 110, a memory portion 115, a signal processing and control unit 120, a display portion 125, user control elements 130, a voice recognition portion 135, a power supply 140, and an external data/control interface 145. The various portions of the portable measurement gauge 105 may be interconnected by one or more power and signal bus connections, or by individual dedicated connections. Various signal interconnections may be made by wireless and/or optical means, if desired.

The sensor portion 110 includes elements that are utilized for sensing the physical dimensions of a workpiece that is being measured. The memory portion 115 includes a storage medium, which may be used to save various system configuration parameters and/or operating instructions or routines, as well as to save various measurement results and/or user-created measurement routines, if desired. It will be appreciated that measurements taken by the device may also be saved in the memory portion 115. In various exemplary embodiments the memory portion 115 may include ROM and/or RAM memory, and may be merged with, or indistinguishable from, the signal processing and control unit 120.

The signal processing and control unit 120 controls the general operations of the portable measurement gauge 105, and provides the output to the display portion 125. As will be described in more detail below, the display portion 125 provides a configurable gauge display which indicates measurement information based on workpiece measurements performed by the portable measurement gauge 105. The user control elements 130 allow a user to control the operations of the portable measurement gauge 105 (e.g., control buttons, touchscreen, etc.).

An (optional) voice recognition portion 135 may include a microphone and circuitry sufficient to receive and interpret various voice commands, and provide corresponding signals to the signal processing and control unit 120. In general, the voice recognition portion 135 may provide a redundant method, or the only method, for performing any of the control operations, selection operations, and the like, that may be required for operating the portable measurement gauge 105, including various operations described in association with various manual and/or visual user control elements herein. The voice recognition portion may also provide sound or voice synthesis if desired, such that various action confirmations, mode confirmations, control actions alternatives, measurement results, and the like, may be provided by audio output to the user. The voice recognition portion 135 may also include a training and/or programming capability that allows the creation of custom commands and/or recognition that is customized for a particular individual. In one embodiment, the voice recognition portion 135 may be implemented using commercially available voice recognition circuitry, software, and/or development tools if desired, such as those associated with RSC-4X or SVC-64 series of IC's available from Sensory® Inc., Santa Clara, Calif., for example.

In one specific example embodiment, the voice recognition portion 135 may be capable of sensing a voice command from a user related to controlling the gauge display. More specifically, as will be described in more detail below with respect to the remote device 155, a user may record a voice command on the remote device, and assign an action command (e.g. a display format or mode option) to the recorded voice command. The display format option and associated voice command may be then downloaded and saved in the memory portion 115 of the portable measurement gauge 105. Then, in operation, when the associated voice command is sensed by the voice recognition portion 135, the display portion 125 may be made to show the gauge display in accordance with the associated display format or mode option. As a specific illustrative example, a user may record a voice command to "change units", wherein the gauge display will change from inches to mm. Techniques for recording and processing voice commands are described in more detail in U.S. Patent Pub. No. 2010/0088100, which is hereby incorporated by reference in its entirety.

The external data/control interface 145 may comprise suitable signal conditioning and/or interface protocol circuitry, as well any desired connector configuration(s), such that a remote device (e.g. remote device 155) may be conveniently interfaced to the portable measurement gauge 105. Portions of the external data/control interface 145 may be provided by, or merged with and indistinguishable from, the signal processing and control unit 120. The external data/control interface 145 may also include a wired or wireless transmitting/receiving unit, which is used to transmit, or receive information to or from computers, instruments, or other devices usable in combination with the portable measurement gauge 105. Such devices may provide programs or instructions that are created remotely from the portable measurement gauge 105, for example by text-based programming, by a compatible program associated with a larger metrology system or other programming interface provided on a PC, or by a separate identical or compatible portable measurement gauge. The programs or instructions may correspond to workpieces that are to be inspected using the portable measurement gauge 105, and may be downloaded or executable under control of the signal processing and control unit 120 through the external data/control interface 145.

The remote device 155 includes a portable gauge display format arrangement portion 160, a memory portion 170, a display portion 175, a processing portion 180 and a user input-output devices portion 185. The portable gauge display format arrangement portion 160 includes a number of portable gauge display format options 162-1 to 162-N, a gauge display portion 164, a display format arrangement customization portion 166, and a gauge data input-output and processing portion 168. The portable gauge display format options 162-1 to 162-N may be utilized to provide or alter various elements in the display format. For example, in one embodiment, the display format options may control at least one of a change in the size, location, orientation, color or units of at least one number or letter on the display that is related to or representative of a workpiece measurement performed by the portable measurement gauge. In certain implementations, at least one of the portable gauge display format options may represent the addition of at least one visual indicator (meaning a non-numerical indicator of a measurement characteristic, such as a pointer that "rotates" around the display, as will be described in more detail below with respect to the display format arrangement 310C of FIG. 3.) In some embodiments, at least one display format option may represent a function which may be modified by a user on the remote device 155 and then represented in the gauge display of the portable measurement gauge 105 (e.g. "if dimension >3 mm, then NG", or "output=3.14159*dimension", etc.) In some embodiments, at least one display format option may represent a graphical or "quasi-analog" display of a measurement value (e.g. as will be described in more detail below with respect to the display format arrangement 310C of FIG. 3.). At least one display format option may represent a statistical display of a plurality of workpiece measurements performed by the portable measurement gauge 105 (e.g. as will be described in more detail below with respect to the display format arrangement 310D of FIG. 3.).

The gauge display portion 164 presents gauge display arrangement representations to the display portion 175. In one embodiment, the gauge display portion 164 enables the display format arrangement on the display portion 175 to be operational as the portable measurement gauge 105 is utilized such that the behavior and response to any measurement operations can be viewed in the display format arrangement on the display portion 175. More generally, a real time link may be established when the portable measurement gauge 105 is coupled to the remote device 155 such that changes on one of the gauge display portion 125 and remote display portion 175 are mimicked on the other display in real time.

The display format arrangement customization portion 166 provides for customization of the input-output, menus, etc. The gauge data input-output and processing portion 168 provides for various functions (e.g. gauge characteristic download, arrangement upload to gauge, real time display interaction, operation of the gauge as a slave when connected, etc.) Some of these types of functions are operational in some embodiments and non-operational in other embodiments.

The memory portion 170 includes resident programs and other data utilized by the remote device. The display portion 175 provides the display for the remote device 155, including the features provided by the portable gauge display format arrangement portion 160. The processing portion 180 provides for the signal processing and control of the remote device, while the user input-output devices portion 185 receives and provides control signals and output to and from various user devices (e.g. the portable measurement gauge 105).

Figure 2:
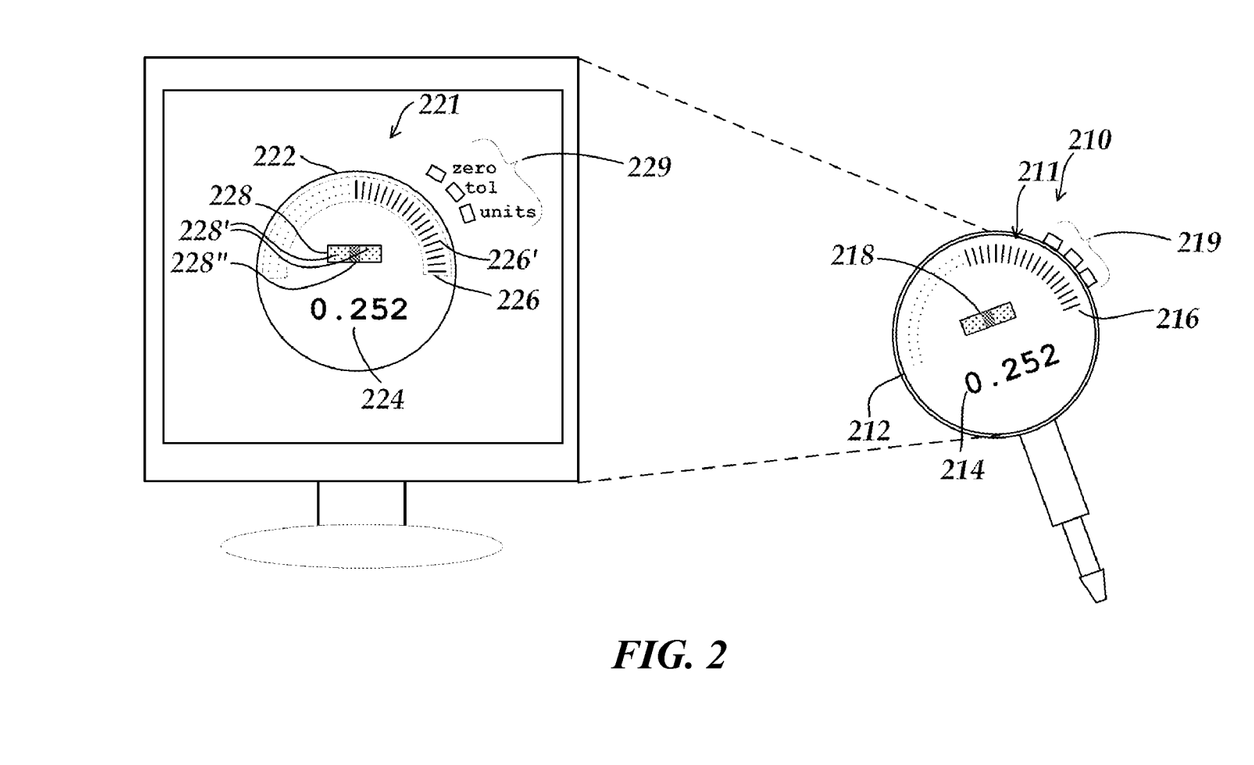
FIG. 2 is a diagram illustrating a display of a portable measurement gauge as synchronized to a display of a remote device.

FIG. 2 is a diagram illustrating a display 210 of a portable measurement gauge as synchronized to a display 220 of a remote device. As shown in FIG. 2, the display 210 includes a configurable gauge display 211 which indicates measurement information based on workpiece measurements performed by the portable measurement gauge. The remote display 220 has a corresponding display format arrangement 221 which has a similar appearance to the configurable gauge display 211.

The defined display format arrangement 221 includes a border 222, measurement value numbers 224, a visual indicator 226 (meaning a non-numerical indicator of a measurement characteristic) and a visual indicator 228. The visual indicator 226 comprises a quasi-analog tolerance measurement representation 226 comprising measurement scale increments 226', which may individually toggle between absence or presence in response to the measurement value (or changes in the measurement value) relative to a target value. The visual indicator 228 comprises a tolerance measurement representation 228 comprising a color zone 228" (e.g. a green zone) corresponding to an "in tolerance" measurement value, and color zones 228' (e.g. red zones) corresponding to an "out of tolerance" measurement values. Each of the color zones may toggle between color absence or presence in response to the measurement value (or changes in the measurement value) relative to a target value. The display 220 of the remote device may also include a schematic button representation 229 of manual pushbuttons included on the portable measurement gauge associated with the display format arrangement 221. In one embodiment, the remote device may include a remote memory for storing one or more display format options, which correspond to the example elements 222, 224, 226 and 228 or the like, which may be selectable to be represented and customized (if desired) in the display format arrangement 221 on the remote display 220. When the remote device is coupled (e.g. by a wired or wireless connection) to the portable measurement gauge, the remote device may command the portable measurement gauge to reconfigure the gauge display 211 so as to have a similar appearance to the defined display format arrangement 221 (e.g. by downloading certain control parameters that govern a routine that operates in the portable measurement gauge, or replacing all or part of the routine that operates in the portable measurement gauge, or the like). More specifically, on the configurable gauge display 211, measurement numbers 214 are made to have a similar appearance to the measurement numbers 224, and the visual indicators 216 and 218 are provided with a similar appearance to the a visual indicators 226 and 228, respectively.

In certain implementations, the remote display is made to accurately reflect the gauge display (e.g. in terms of screen shape, pixel characteristics, etc.). As a specific illustrative example, the outer perimeter 212 of the display 210 is mimicked as illustrated by the border 222 of the display format arrangement 221. In certain embodiments, the internal characteristics of the portable measurement gauge are downloaded, or an identifier is downloaded to recall a corresponding portable measurement gauge configuration file residing on the host of the remote display, to either activate of deactivate certain display format options and other features presented on the remote device. As one example, the gauge display pixel configuration or the custom LCD segment configuration which limit the customization options of the gauge display may be downloaded or recalled. As another example, if there is a true peak hold capability in the portable measurement gauge, then that may be offered as a display format option on the remote device. As another example, if the portable measurement gauge includes manual control buttons (e.g. the buttons 219), then they may be mimicked on the display 220, and/or operated and/or their functions changed as part of the process of modifying the display format arrangement 221. As another example, if the portable measurement gauge has significant memory capability, then display format options may be presented corresponding to statistical display options, maximum/minimum readings, etc.

In addition, in certain implementations, various other display characteristics of the portable measurement gauge may be downloaded to the remote device to be mimicked in the display format arrangement 221 on the remote display. For example, if the display 210 is a color display on the gauge, the display format arrangement 221 may be correspondingly colored. In certain implementations, the remote device may include several gauge models, and the characteristics of the portable measurement gauge may be downloaded as a basis for determining which gauge models may be presented as options for the display format arrangement 221. In certain embodiments, the remote device may also download and save a current set of parameters corresponding to the configurable gauge display 211, so that after changes are made the portable measurement gauge can be returned to a previous configuration if desired.

In certain embodiments, the display format arrangement 221 on the remote display may be made to be operational as the portable measurement gauge is used such that the behavior in response to any measurement operations can be viewed in the display format arrangement 221. As a specific illustrative example, as the measurement numbers 214 which represent workpiece measurements change, a corresponding change may be mimicked in the measurement numbers 224 in the display format arrangement 221. In certain embodiments, such mimicking operations may be utilized as a "wandering interface terminal" for such portable measurement gauges. More generally, a real time link may be established when the portable measurement gauge is coupled to the remote device such that changes on one of the gauge display and remote display are mimicked on the other display in real time.

In certain embodiments, the remote device may be configured to be coupled by at least one of a wired or wireless connection to a first portable measurement gauge, and may also be subsequently or simultaneously coupled by at least one of a wired or wireless connection to at least a second portable measurement gauge comprising a configurable gauge display similar to the configurable gauge display of the first portable measurement gauge. Then, when a user defines a display format arrangement for the first portable measurement gauge using the remote device to perform operations such as those outlined above, the remote device is furthermore configured to command the second portable measurement gauge to reconfigure the gauge display of the second portable measurement so as to have a gauge display similar to the first portable measurement gauge.

Figure 3:
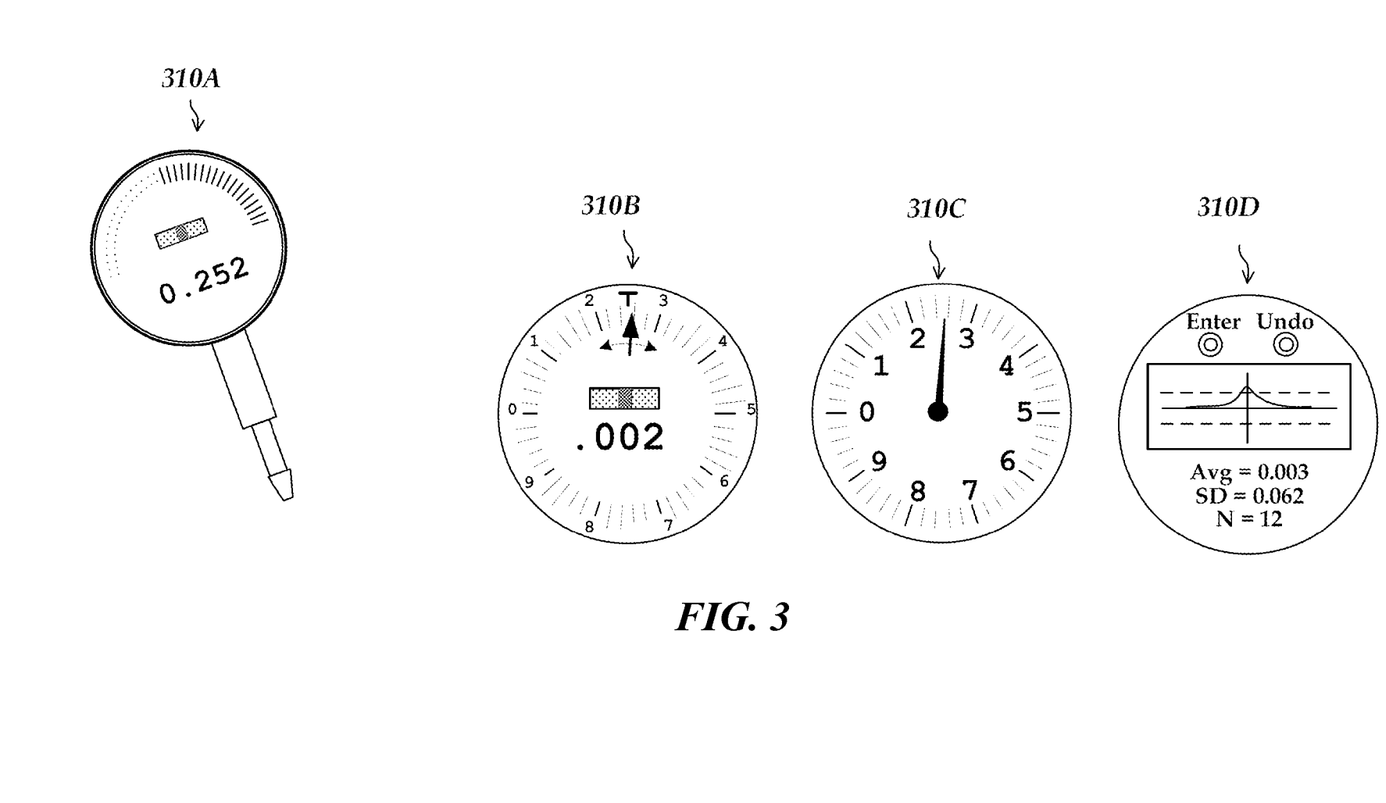
FIG. 3 is a diagram illustrating various display format arrangements for a portable measurement gauge.

FIG. 3 is a diagram illustrating various display format arrangements 310A-310D for a portable measurement gauge. As shown in FIG. 3, the display format arrangement 310A is mimicked on a portable measurement gauge display, and is similar to the display format arrangement 221 of FIG. 2. The display format arrangement 310B illustrates a visual indicator comprising a circular scale with numbered increments and a quasi-analog pointer that points to the measurement value on the scale, with a measurement number that represents a deviation from a target measurement value (e.g. a target value as may be set using a button on the side or face of the portable measurement gauge according to known methods), as well as a visual indicator comprising an in/out of tolerance representation (e.g. such as the visual indicator 228) located in the middle. The display format arrangement 310C illustrates an incremented circular scale with a quasi-analog pointer element in the middle which "rotates" to indicate a measurement value. The display format arrangement 310D provides a graphical display along with numerical representations of statistical measurement data. In one embodiment, the display format arrangement 310D may provide a bar chart or other graphical representation of multiple measurements that have been taken with the portable measurement gauge. When the portable measurement gauge display is a touch screen type display, the display format arrangement 310D may also comprise the touch-sensitive "soft" control button representations labeled "Enter" and "Undo" in display format arrangement 310D. It will be understood that the location, appearance, function and labels of such button representations may be mimicked and configured in the same manner as outlined above with respect to other features of the configurable gauge display.

Figure 4:
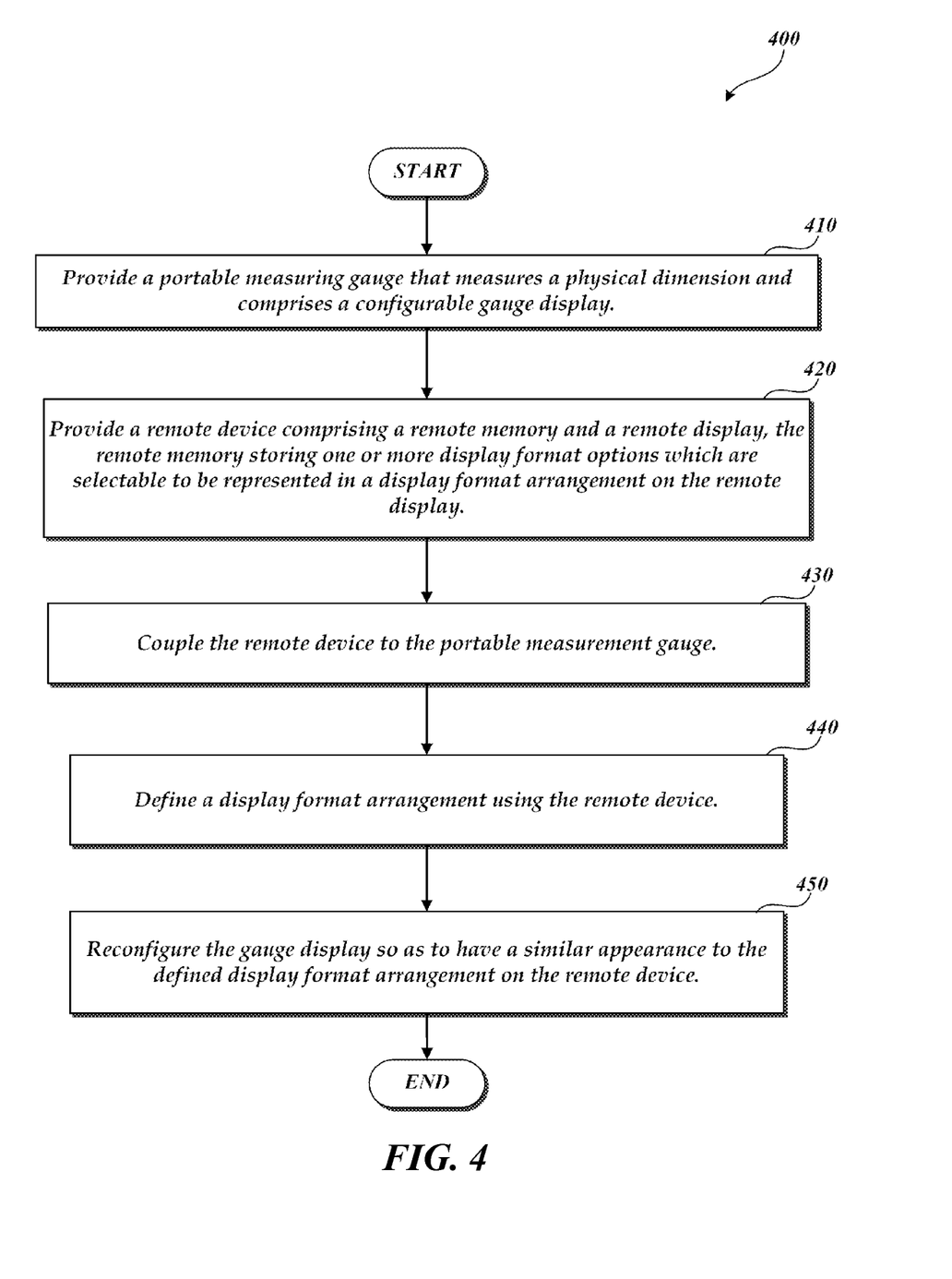
FIG. 4 is a flow diagram illustrating one exemplary embodiment of a routine for utilizing a remote device for reconfiguring a display on a portable measurement gauge.

FIG. 4 is a flow diagram illustrating one exemplary embodiment of a routine 400 for utilizing a remote device for reconfiguring a display on a portable measurement gauge. As shown in FIG. 4, at a block 410, a portable measurement gauge is provided that measures a physical dimension and comprises a configurable gauge display. At a block 420, a remote device is provided comprising a remote memory and a remote display, the remote memory storing one or more display format options which are selectable to be represented in a display format arrangement on the remote display. At a block 430, the remote device is coupled to the portable measurement gauge. At a block 440, a display format arrangement is defined using the remote device. At a block 450, the gauge display is reconfigured so as to have a similar appearance to the defined display format arrangement on the remote device.

Figure 5:
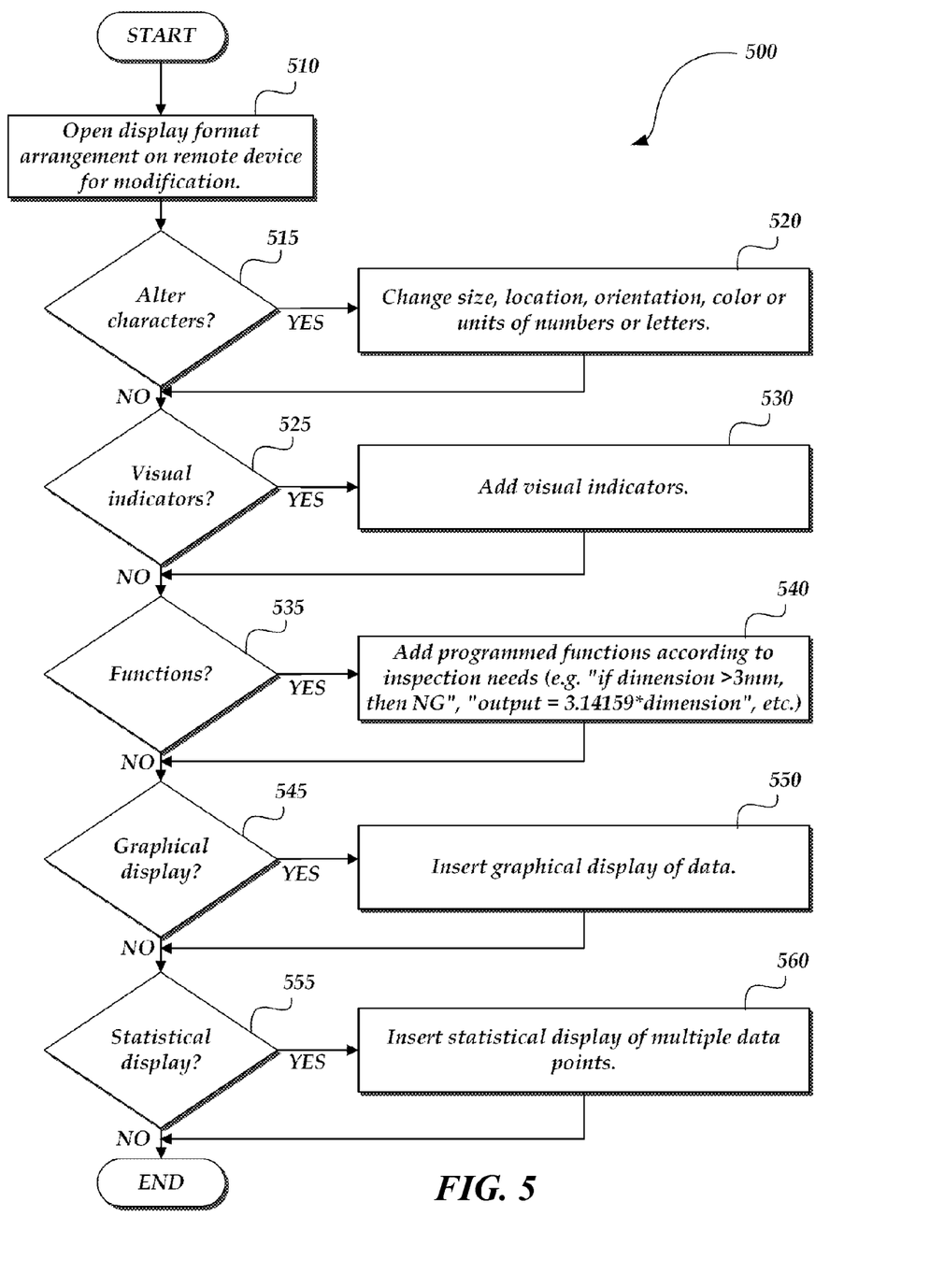
FIG. 5 is a flow diagram illustrating one exemplary embodiment of a routine illustrating specific example display format options.

FIG. 5 is a flow diagram illustrating one exemplary embodiment of a routine 500 illustrating specific example display format options. As shown in FIG. 5, at a block 510, a display format arrangement is opened for modification on a remote device (e.g. a PC, laptop, tablet, smartphone, etc.) At a decision block 515, a determination is made as to whether the appearances of any characters are to be altered. If any characters are to be altered, then the routine continues to a block 520, where the size, location, orientation, color or units of numbers or letters are changed. If no characters are to be altered, then the routine continues to a decision block 525.

At the decision block 525, a determination is made as to whether any visual indicators are to be added. If any visual indicators are to be added, then the routine continues to a block 530, where the visual indicators are added. If no visual indicators are to be added, then the routine continues to a decision block 535.

At the decision block 535, a determination is made as to whether any functions are to be added. If any functions are to be added, then the routine continues to a block 540, where various types of programmed functions are added, according to the specific inspection needs (e.g. "if dimension >3 mm, then NG", or "output=3.14159*dimension", etc.) if no functions are to be added, then the routine continues to a decision block 545.

At the decision block 545, a determination is made as to whether a graphical display of data is to be inserted. If a graphical display is to be inserted, then the routine continues to a block 550, where the graphical display of the data is inserted. If no graphical display is to be inserted, then the routine continues to a decision block 555.

At the decision block 555, a determination is made as to whether a statistical display of multiple data points is to be inserted. If a statistical display is to be inserted, then the routine continues to a block 560, where the statistical display of the multiple data points is inserted. If no statistical display is to be inserted, then the routine ends.

Figure 6:
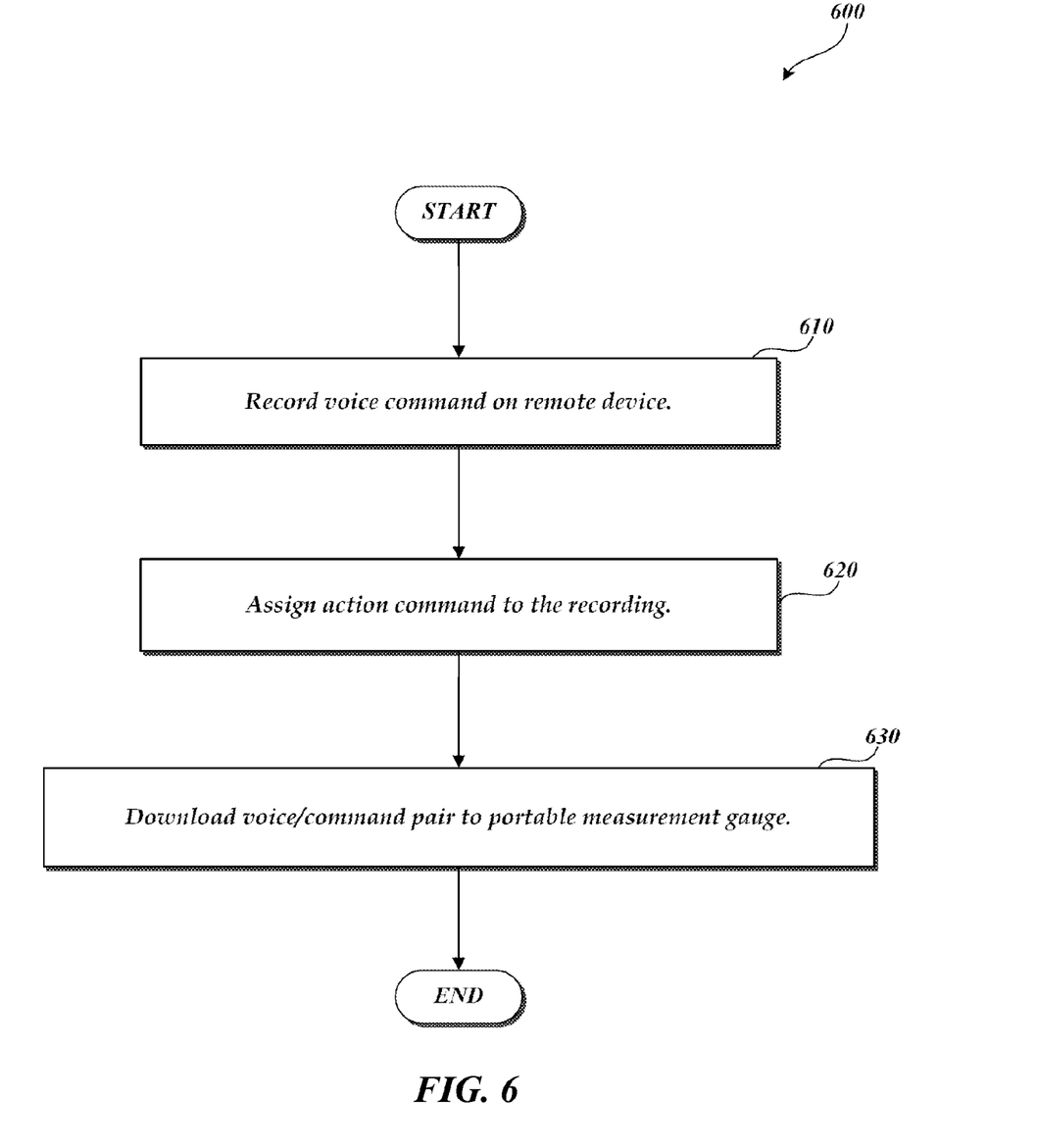
FIG. 6 is a flow diagram illustrating one exemplary embodiment of a routine for recording a voice command for reconfiguring a portable measurement gauge.

FIG. 6 is a flow diagram illustrating one exemplary embodiment of a routine 600 for recording a voice command for reconfiguring a portable measurement gauge. As shown in FIG. 5, at a block 610, a user records a voice command on the remote device. At a block 620, an action command is assigned to the recording. At a block 630, the voice/action pair is downloaded to the portable measurement gauge. A user may then utilize the recorded voice command for controlling the display and/or operating mode on the portable measurement gauge. As a specific example operation where the voice command is recorded for "change units" (e.g. from inches to mm), a user may speak this command to the portable measurement gauge, which would then change from inches to mm for the measurement(s) indicated on the display.

It will be appreciated that in accordance with the previously described embodiments, a user is able to independently modify the appearance and functionality of a display for a portable measurement gauge, according to individual needs. The utilization of the remote device allows the display parameters to be easily selected and modified, even for portable measurement gauges where the display size is generally small and for which touchscreen operations would be difficult to implement, in certain implementations, the remote device may include skins, editable/selectable skin components, bitmap editing capability, etc. for implementing certain of the above described display reconfiguration operations. While the reconfiguration elements have generally been described as being stored in the memory of the remote device, such may also reside in other locations (e.g. the Internet, etc.), with the remote device functioning as a link that passes the key parameters.

From the foregoing, it will be appreciated that specific embodiments of the invention have been described herein for purposes of illustration, but that various modifications may be made without deviating from the scope of the invention. Accordingly, the invention is not limited except as by the appended claims.

We claim:

1. A system for modifying a gauge display that presents workpiece measurement information on a portable measurement gauge, the system comprising:
a first portable measurement gauge which measures one or more physical dimensions of an object, the first portable measurement gauge comprising a configurable gauge display which indicates measurement information based on workpiece measurements performed by the first portable measurement gauge; and
a remote device that can be coupled by at least one of a wired or wireless connection to at least the first portable measurement gauge, the remote device comprising a remote memory and a remote display, the remote memory storing one or more display format options which are selectable to be represented in a display format arrangement on the remote display, wherein when the remote device is coupled to the first portable measurement gauge and a user defines a display format arrangement using the remote device, the remote device commands the first portable measurement gauge to reconfigure the gauge display so as to have a similar appearance to the defined display format arrangement.

2. The system of claim 1, wherein the remote device is one of a PC, laptop, tablet or smartphone.

3. The system of claim 1, wherein the first portable measurement gauge is one of a digital caliper, digital "dial" gauge, height gauge, micrometer or indicator.

4. The system of claim 1, wherein at least one display format option controls at least one of a change in the size, location, orientation, color or units of at least one number or letter on the display that is related to or representative of a workpiece measurement performed by the first portable measurement gauge.

5. The system of claim 1, wherein at least one display format option represents the addition of at least one visual indicator.

6. The system of claim 1, wherein at least one display format option represents a function which may be modified by a user on the remote device and then represented on the gauge display.

7. The system of claim 1, wherein at least one display format option represents a graphical display of measurement data.

8. The system of claim 1, wherein at least one display format option represents a statistical display of a plurality of workpiece measurements performed by the first portable measurement gauge.

9. The system of claim 1, wherein at least one internal characteristic of the first portable measurement gauge is downloaded to the remote device to either activate or deactivate at least one display format option presented on the remote device.

10. The system of claim 1, wherein at least one internal characteristic of the first portable measurement gauge is downloaded to the remote device to be mimicked in a display format arrangement on the remote display.

11. The system of claim 10, wherein the internal characteristic is a color on the gauge display which is represented by a corresponding color in the display format arrangement on the remote display.

12. The system of claim 1, wherein the display format arrangement on the remote display is operational as the first portable measurement gauge is used such that the behavior in response to any measurement operations can be viewed in the display format arrangement on the remote display.

13. The system of claim 1, wherein a real time link may be established when the first portable measurement gauge is coupled to the remote device such that changes on one of the gauge display or remote display are mimicked on the other display in real time.

14. The system of claim 1, wherein the first portable measurement gauge further comprises a voice input element that is capable of sensing a voice command from a user, and the remote device further associates a voice command with a display format option, wherein the display format option and associated voice command may be downloaded to the first portable measurement gauge such that when the associated voice command is sensed by the voice input element of the first portable measurement gauge, the gauge display is controlled in accordance with the associated display format option.

15. The system of claim 1, further comprising at least a second portable measurement gauge which measures one or more physical dimensions of an object, the second portable measurement gauge comprising a configurable gauge display which indicates measurement information in a manner similar to the configurable gauge display of the first portable measurement gauge, based on workpiece measurements performed by the second portable measurement gauge, wherein:
the remote device is furthermore configured to be coupled by at least one of a wired or wireless connection to the second portable measurement gauge; and
when a user defines a display format arrangement for the first portable measurement gauge using the remote device, the remote device is furthermore configured to command the second portable measurement gauge to reconfigure the gauge display of the second portable measurement so as to have a similar appearance to the defined display format arrangement.

16. A system for modifying a gauge display that presents workpiece measurement information on a portable measurement gauge, the system comprising:
a portable measurement gauge which measures one or more physical dimensions of an object, the portable measurement gauge comprising a configurable gauge display and a voice input element, the configurable gauge display indicating measurement information based on workpiece measurements performed by the portable measurement gauge, and the voice input element being capable of sensing a voice command from a user; and
a remote device that can be coupled by at least one of a wired or wireless connection to the portable measurement gauge, the remote device comprising a remote memory and a remote display, the remote memory storing one or more display format options, wherein when a voice command is defined as being associated with a display format option, the display format option and associated voice command may be downloaded to the portable measurement gauge such that when the associated voice command is sensed by the voice input element of the portable measurement gauge, the gauge display is controlled in accordance with the associated display format option.

17. The system of claim 16, wherein the portable measurement gauge is one of a digital caliper, digital "dial" gauge, height gauge, micrometer or indicator.

18. The system of claim 16, wherein the associated voice command controls at least one of a change in the size, location, orientation, color or units of at least one number or letter on the display that is related to or representative of a workpiece measurement performed by the portable measurement gauge, or the addition of at least one visual indicator to the display.

19. A non-transitory, computer readable media with instructions stored thereon that are executable by a processor to perform operations of:

providing one or more display format options on a remote display of a remote device, wherein the remote device may be coupled by at least one of a wired or wireless connection to a portable measurement gauge which measures one or more physical dimensions of an object and comprises a configurable gauge display which indicates measurement information based on workpiece measurements performed by the portable measurement gauge;

providing a display format arrangement on the remote display corresponding to one or more selected display format options; and reconfiguring the gauge display on the portable measurement gauge so as to have a similar appearance to a defined display format arrangement on the remote display of the remote device when the remote device is coupled to the portable measurement gauge and a display format arrangement is defined on the remote device.

20. The non-transitory, computer readable media of claim 19, wherein the portable measurement gauge is one of a digital caliper, digital "dial" gauge, height gauge, micrometer or indicator.

* * * * *